US012425546B2

(12) United States Patent
Muthuganesh et al.

(10) Patent No.: US 12,425,546 B2
(45) Date of Patent: Sep. 23, 2025

(54) SYSTEM AND METHOD FOR TRANSMITTING COORDINATE DATA IN A NETWORK COMMUNICATION

(71) Applicant: E-CON SYSTEMS INDIA PRIVATE LIMITED, Tamilnadu (IN)

(72) Inventors: Arun Muthuganesh, Tamilnadu (IN); Shanthakumar, Tamilnadu (IN)

(73) Assignee: E-CON SYSTEMS INDIA PRIVATE LIMITED, Tamilnadu (IN)

( * ) Notice: Subject to any disclaimer, the term of this patent is extended or adjusted under 35 U.S.C. 154(b) by 121 days.

(21) Appl. No.: 18/466,645

(22) Filed: Sep. 13, 2023

(65) Prior Publication Data

US 2025/0088609 A1 Mar. 13, 2025

(51) Int. Cl.
*H04N 7/18* (2006.01)
*H04L 65/65* (2022.01)

(52) U.S. Cl.
CPC ............ *H04N 7/183* (2013.01); *H04L 65/65* (2022.05)

(58) Field of Classification Search
None
See application file for complete search history.

(56) References Cited

U.S. PATENT DOCUMENTS

| | | | |
|---|---|---|---|
| 9,866,820 B1* | 1/2018 | Agrawal | H04N 13/239 |
| 10,489,912 B1* | 11/2019 | Brailovskiy | H04N 13/204 |
| 12,112,546 B2* | 10/2024 | Vesperman | A01B 69/001 |
| 2003/0048357 A1* | 3/2003 | Kain | G01C 11/02 |
| | | | 348/117 |
| 2010/0265329 A1* | 10/2010 | Doneker | H04N 23/695 |
| | | | 348/E5.024 |
| 2014/0300704 A1* | 10/2014 | Ramaswamy | G06T 7/85 |
| | | | 348/48 |
| 2022/0021723 A1* | 1/2022 | Oyman | H04L 65/403 |
| 2024/0161339 A1* | 5/2024 | Slutsky | G06T 7/85 |
| 2024/0230866 A1* | 7/2024 | Ma | G06T 7/10 |

* cited by examiner

*Primary Examiner* — Gelek W Topgyal
(74) *Attorney, Agent, or Firm* — Sage Patent Group

(57) ABSTRACT

System and method for transmitting coordinate data in a network communication. The present invention describes a method for transmitting coordinate data in a network communication. The method comprising: receiving, through a sensor (106), the coordinate data with respect to an original position of a device (100) installed in a predefined area, monitoring, through a processor (102) of the device (100), if there is any change in the coordinate data with respect to the original position of the device (100), in real-time, embedding, through the processor (102), the coordinate data in a Real-time Transport Control Protocol (RTCP) report in the network communication, based on the monitoring, and transmitting, through a transmitter (108) of the device (100), the coordinate data embedded into the RTCP report over an RTP protocol.

5 Claims, 6 Drawing Sheets

▶ Ethernet II, Src: e-CONIND_00:29:74 (64:35:1c:00:29:74), Dst: 88:a4:c2:d5:29:ac (88:a4:c2:29:ac)
▶ Internet Protocol Version 4, Src: 192.168.88.30, Dst: 192.168.88.32
▶ User Datagram Protocol, Src Port: 6971, Dst Port: 50467
▼ Real-time Transport Control Protocol (Sender Report)
    [Stream setup by RTSP (frame 67)]
    10.. .... = Version: RFC 1889 Version (2)
    ..0. .... = Padding: False
    ...0 .... = Reception report count: 0
    Packet type: Sender Report (200)
    Length: 11 (48 bytes)
    Sender SSRC: 0x103944677 (272189047)
    Timestamp, MSW: 3864286735 (0xe654560f)
    Timestamp, LSW: 407940289 (0x1850acc1)
    [MSW and LSW as NTP timestamp: Jun 15, 2022 12:58:55.094981000 UTC]
    RTP timestamp: 3796514868
    Sender's packet count: 4635
    Sender's octet count: 6467622
  ▼ Payload Specific Extension
    Extension Type: MS - Padding (6)
    Extension Length: 20
    Profile-specific extension: 0003003fdc0fdf240d4ffce001c0032
▼ Real-time Transport Control Protocol (Source description)

```
0000  88 a4 c2 d5 29 ac 64 35  1c 00 29 74 08 00 45 00   ....).d5 ..)t..E.
0010  00 74 a3 ef 40 00 40 11  64 fa c0 a8 58 1e c0 a8   .t..@.@. d...X...
0020  58 20 1b 3b c5 23 00 60  66 6d ac c1 00 0b 10 39   X .;.#.` fm.....9
0030  46 77 e6 54 56 0f 18 50  e2 4a 38 00 03 34 00 00   Fw.TV..P .J8..4..
0040  12 1b 00 62 b0 26 00 06  00 14 00 03 00 03 fd c0   ...b.&.. ........
0050  fd f2 40 d4 ff ce 00 1c  00 32 81 ca 00 09 10 39   ..@..... .2.....9
0060  46 77 01 1d 52 6f 75 74  65 43 41 4d 5f 50 5f 53   Fw..Rout eCAM_P_S
0070  31 30 30 4d 5f 43 55 35  30 5f 43 48 4c 57 5f 42   100M_CU5 0_CHLW_B
0070  58 00                                              X.
```

FIG. 5

SYSTEM AND METHOD FOR TRANSMITTING COORDINATE DATA IN A NETWORK COMMUNICATION

FIELD OF THE INVENTION

The present disclosure relates to commercial and industrial field Ethernet cameras. More particularly, it is related to a method for transmitting coordinate data (camera displacement data) for a device.

BACKGROUND OF THE INVENTION

The following description of related art is intended to provide background information pertaining to the field of the present disclosure. This section may include certain aspects of the art that may be related to various aspects of the present disclosure. However, it should be appreciated that this section be used only to enhance the understanding of the reader with respect to the present disclosure, and therefore, unless otherwise indicated, it should not be assumed that any of the approaches described in this section qualify as prior art merely by virtue of their inclusion in this section.

Ethernet cameras are widely used for monitoring and surveillance purposes in various fields, such as civil engineering, security, and industrial applications. Position stability of the Ethernet camera is very important to ensure effective surveillance and monitoring. It is therefore important to regularly monitor any displacement in Ethernet camera's position to ensure reliability of captured images and videos.

Since, the Ethernet cameras may experience displacement or misalignment due to environmental factors, such as wind, vibration, temperature, or human interference, therefore, on time detection of any displacement is very important to ensure smooth operation of the Ethernet camera not only in the field of surveillance but also its application in industrial and wildlife observations.

Existing solutions make use of image processing techniques to identify changes in a field of view of the Ethernet camera. This method involved lot of computations and is prone to errors. Another existing solution gives only the IMU (Inertial Measurement Unit) data, and the IMU data needs to be processed in a host machine which creates lots of processing load on the host machine.

SUMMARY OF THE INVENTION

Detecting the Ethernet camera displacement after initial installation is important for ensuring the accuracy and reliability of the captured images and videos. This helps in security surveillance, industrial inspection, and wildlife observations.

The present invention is helpful in detecting the displacement of a device (herein an Ethernet camera) after fixing the Ethernet camera in fields. If there is any change in the initial fixed position of the Ethernet camera due to environmental factors or human interface, such displacement may be detected, and the Ethernet camera may provide the relative positional changes in X, Y and Z axis from an original position of the Ethernet camera. The Ethernet camera internally performs all calculation regarding displacement and provides coordinate data (may also be referred as location data or position data) to a host machine. In this way, the proposed embodiments of the disclosure reduces a load of computations in the host machine. Using the displacement data, necessary action may be taken and thus, this invention helps in ensuring the accuracy and reliability of frames captured through the Ethernet camera.

The current invention makes use of a Real-Time Transport Control Protocol (RTCP) report and embed the displacement data (camera displacement data) in a protocol level. The displacement data may be used by any standard client application to receive the RTCP report and check for camera displacement and take any necessary action.

According to a first aspect of the present disclosure, a method for transmitting coordinate data in a network communication is provided. The method comprising: receiving, through a sensor, the coordinate data with respect to an original position of a device installed in a predefined area, monitoring, through a processor of the device, if there is any change in the coordinate data with respect to the original position of the device, in real-time, embedding, through the processor, the coordinate data in a Real-time Transport Control Protocol (RTCP) report in the network communication, based on the monitoring, and transmitting, through a transmitter of the device, the coordinate data embedded into the RTCP report over an RTP protocol.

Real-time Transport Protocol (RTP) is a network protocol for the delivery of audio and video over the internet. The RTP protocol is designed to provide end-to-end network transport functions suitable for applications transmitting real-time data, such as audio and video. Further, the RTP is used in conjunction with the Real-time Transport Control Protocol (RTCP), which is used to monitor the quality of the data transmission. RTP provides the actual delivery of the media, while RTCP is used to provide feedback on the quality of the transmission and to provide other control information.

Advantageously, the proposed device smartly calculates the displacement of the device from an original position of the device which will decrease processing load in a host machine. Further, the coordinate data is added to an RTCP report at a protocol level. As RTCP is a part of RTP protocol, any standard application may be used to receive the RTCP report and make use of the displacement data thus avoiding any additional device or process to sense and share the displacement data.

In some embodiments, the coordinate data comprises displacement data of the device with respect to an original position of the device, wherein the displacement data comprises data regarding each of a Pitch, Yaw or a Roll position of the device, and wherein the coordinate data is embedded along with a time stamp in the RTCP report.

In some embodiments, the coordinate data is embedded as a Payload Specific Extension in the RTCP report.

In some embodiments, the monitoring comprises: detecting, if there is a change in the coordinate data with respect to the original position of the device, identifying, whether the change in the coordinate data of the device is greater than a threshold value, and embedding, the coordinate data in the RTCP report, in case the change in the coordinate data is greater than the threshold value.

In some embodiments, the monitoring comprises: identifying, if the change in the coordinate data is greater than a safe threshold value set in the threshold value, and flagging, the embedded coordinate data in the RTCP report as alert coordinate data, in case the change in the coordinate data is greater than the safe threshold value set.

In some embodiments, the monitoring comprises: detecting, if there is a change in the coordinate data with respect to the original position of the device, identifying, whether the change in the coordinate data of the device is lesser than the threshold value, and discarding, the coordinate data, wherein the coordinate data is not added in the RTCP report, in case the change in the coordinate data is lesser than the threshold value.

According to a second aspect of the present disclosure, a device for transmitting coordinate data in a network communication is provided. The device comprising: at least one sensor, configured for sensing the coordinate data with respect to an original position of the device installed in a predefined area, a processor configured for: receiving, through the at least one sensor, the coordinate data with respect to an original position of the device installed in a predefined area, monitoring, if there is any change in the coordinate data with respect to the original position of the device, in real-time, and embedding, the coordinate data in a Real-time Transport Control Protocol (RTCP) report in the network communication, based on the monitoring. The device further comprises of a transmitter configured for transmitting the coordinate data embedded into the RTCP report over an RTP protocol.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF ACCOMPANYING DRAWINGS

The invention will now be described in relation to the accompanying drawings in which . . .

FIG. 5 illustrates an example of an RTCP report carrying the displacement data, according to some embodiments of the invention.

DETAILED DESCRIPTION OF THE PREFERRED EMBODIMENT

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The present invention provides an electronic device (herein among a plurality of communication devices 100a-100n) that smartly calculates its displacement from an original position at which it was initially installed. Further, the electronic device adds displacement data indicating the displacement (coordinate data) to an RTCP report at a protocol level, and transmits the RTCP report to a system 300 or a host machine 400. In this manner, the above-mentioned electronic device reduces processing load on the system 300 or the host machine 400. In addition, the RTCP report is a part of the RTP protocol and thus any standard application may receive and use the displacement data.

Figure 1:
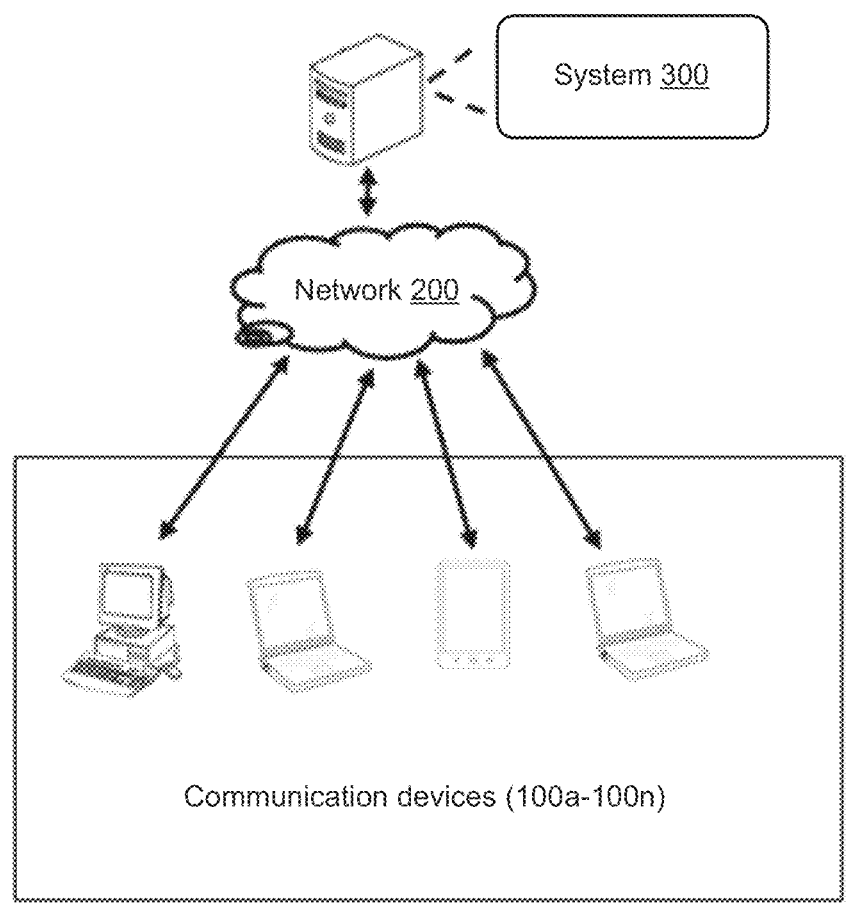
FIG. 1 illustrates a network implementation of a device 100 transmitting coordinate data in a network communication, according to some embodiments of the invention.

FIG. 1 discloses a network implementation of a system 300 and a plurality of communication devices (100a-100n) configured to communicate with each other via a network 200. The network communication system further includes a server connected to the system 300. The server may be further connected to the plurality of communication devices (100a-100n) through the network 200. The device 100 is used to transmit coordinate data in a RTCP report in a network communication.

It should be understood that the server, the system 300, and the plurality of communication devices (100a-100n) corresponds to computing devices. It may be understood that the server may also be implemented in a variety of computing systems such as, a laptop computer, a desktop computer, a notebook, a workstation, a mainframe computer, a network server, a cloud-based computing environment, or a smart phone, and the like. It may be understood that the system may correspond to a variety of portable computing devices such as, a laptop computer, a desktop computer, a notebook, a smart phone, a tablet, a phablet, and the like. Further, it may be understood that the device 100 may be, but not limited to, a camera, specifically an Ethernet camera.

In an example implementation, the network 200 may be a wireless network, a wired network, or a combination thereof. The network 80 can be implemented as one of the different types of networks, such as intranet, Local Area Network, LAN, Wireless Personal Area Network, WPAN, Wireless Local Area Network, WLAN, wide area network, WAN, the Internet, and the like. The network 200 may either be a dedicated network or a shared network. The shared network represents an association of the different types of networks that use a variety of protocols, for example, MQ Telemetry Transport, MQTT, Extensible Messaging and Presence Protocol, XMPP, Hypertext Transfer Protocol, HTTP, Transmission Control Protocol/Internet Protocol, TCP/IP, Wireless Application Protocol, WAP, and the like, to communicate with one another. Further, the communication network 600 may include a variety of network devices, including routers, bridges, servers, computing devices, storage devices, and the like.

In accordance with embodiments disclosed herein, the server is configured for establishing the communication between the system 300 and the plurality of communication devices 100a-100n. For example, the server is configured for receiving the RTCP report including the displacement data (coordinate data of the device 100) from the device 100, and transmit the RTCP report to the system 300 via the network 200.

Figure 2:
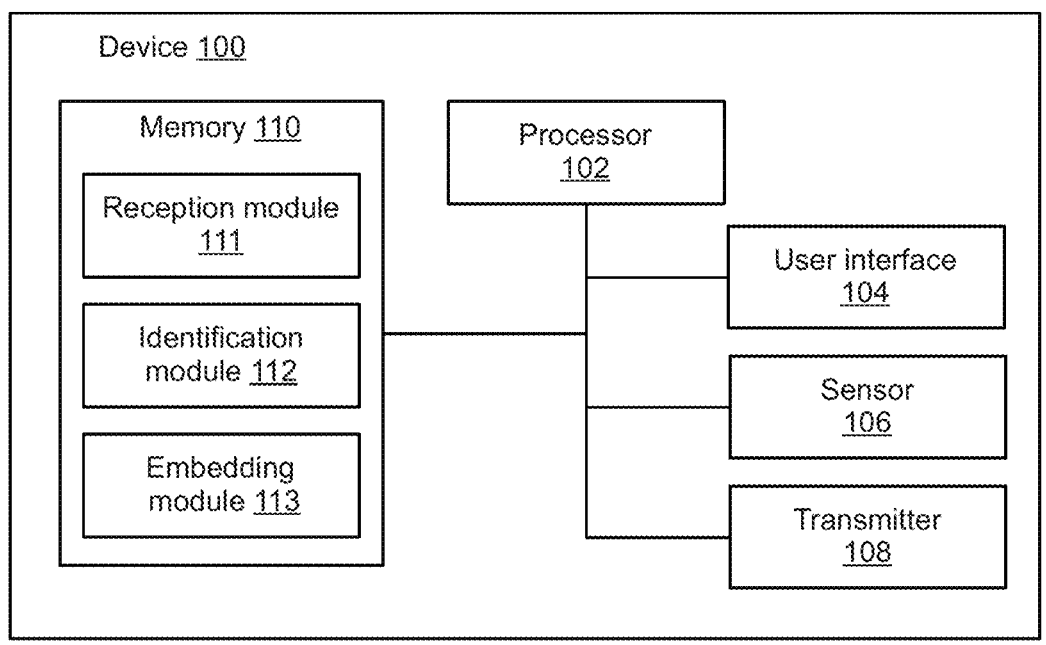
FIG. 2 illustrates a block diagram of a device 100, according to some embodiments of the invention.
Figure 3A:
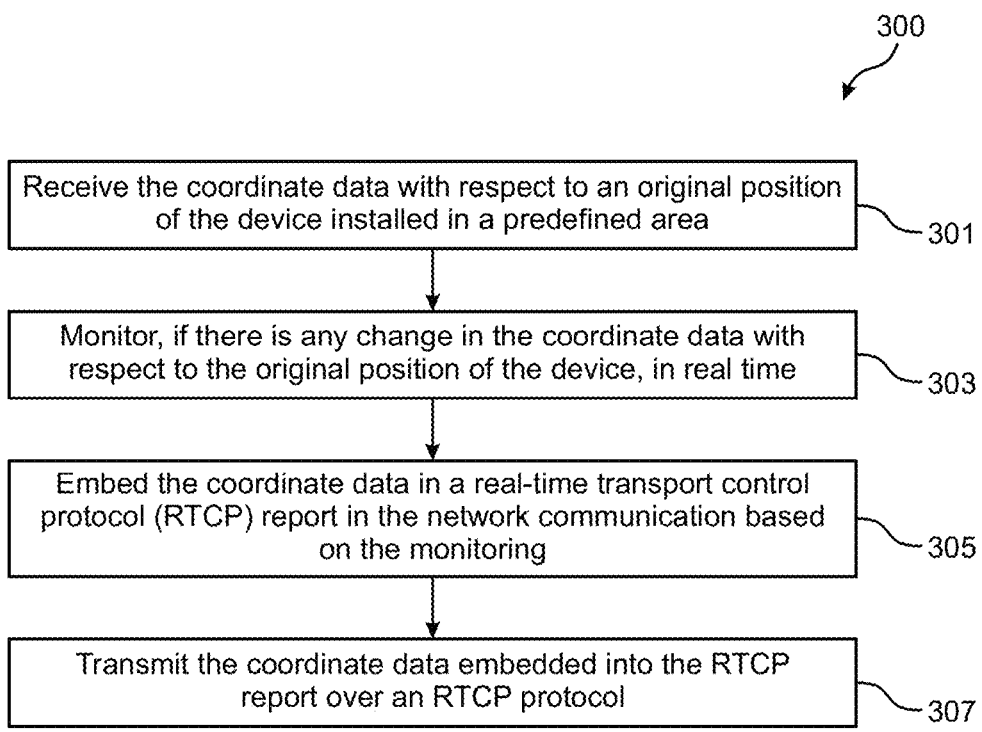
FIG. 3A illustrates a flowchart illustrating example method steps of a method 300 performed by a device 100, according to some embodiments of the invention.

FIG. 2 is an example schematic diagram showing the device 100. The device 100 is capable of embedding the coordinate data in an RTCP report and transmitting the coordinate data embedded in the RTCP report for further processing to the system 300 or the host machine 400 (shown in FIG. 4). Further, the device 100 is configured to cause performance of the method 300 (as depicted in FIG. 3A later) facilitating transmission of the RTCP report based on the change in the coordinate data.

According to at least some embodiments of the present invention, the device 100 in FIG. 2 comprises a processor 102, a user interface 104, a sensor 106, a transmitter 108, and a memory 110 storing one or more modules. These modules comprises a reception module 111, an identification module 112, and an embedding module 113.

The processor 102 is configured to execute the plurality of modules 111 to 113. The memory 110 may also serve as a repository for storing data processed, received, and generated by one or more of modules 111 to 113. The memory 110 may include data generated as a result of the execution of one or more modules 111 to 113. The memory 110 may include any computer-readable medium or computer program product known in the art including, for example, volatile memory, such as Static Random-Access Memory, SRAM, and Dynamic Random-Access Memory, DRAM, and/or non-volatile memory, such as Read Only Memory, ROM, Erasable Programmable ROM, EPROM, Electrically Erasable and Programmable ROM, EEPROM, flash memories, hard disks, optical disks, and magnetic tapes.

The user interface 104 may include a variety of software and hardware interfaces, for example, a web interface, a graphical user interface, a command line interface, and the like. The user interface 104 may allow interaction with the system 300. The user interface 104 may facilitate multiple communications within a wide variety of networks and protocol types, including wired networks, for example, LAN, cable, etc., and wireless networks, such as WLAN, cellular, or satellite to establish the communication between the system 300 and the plurality of communication devices (100a-100n).

In an embodiment, at the time of installing the device 100, an initial installation position (original position) is saved in the memory 110. The device 100 calculates a difference in the initial installation position and a current position internally in a case there is change in the original position and embeds the difference as a coordinate data (may also be referred as displacement data) in the RTCP report.

The sensor 106 detects coordinates of the device 100 at regular intervals. The sensor 106 may be any sensor, but not limited to, an inertial measurement unit (IMU) sensor or an accelerometer.

The device 100 further comprises the transmitter 108 configured for transmitting the coordinate data to the system 300 or the host machine 400.

The reception module 111 is configured to receive the coordinate data with respect to the original position of the device 100, via the sensor 106. The coordinate data comprises data regarding each of a Pitch, Yaw or a Roll position of the device 100.

The identification module 112 is configured for monitoring whether there is any change in the coordinate data of the device 100 with respect to the original position of the device 100. Further, the identification module 112 is configured to identify whether the change in the coordinate data is greater or smaller than a threshold value, and accordingly forwards the coordinate data to an embedding module 113. Particularly, the identification module 112 is configured to identify whether the change in the coordinate data is greater or lesser than the threshold value. The coordinate data is transmitted to the embedding module only when the change in the coordinate data is greater than the threshold value. The coordinate data is not transmitted to the embedding module 113 when the coordinate data is lesser than the threshold value.

The embedding module 213 is configured for embedding the coordinate data in a Real-time Transport Control Protocol (RTCP) report in a network communication, based on the monitoring that there is a change in the coordinate data with respect to the original position of the device 100.

In an event, the change in the coordinate data is greater than the threshold value, only then the embedding module 113 is configured for embedding the coordinate data in the RTCP report. In an event, the change in the coordinate data is lesser than the threshold value, the coordinate data is not embedded in the RTCP report. Further, the embedding module 113 is configured for embedding a timestamp associated with the coordinate data along with the coordinate data in the RTCP report. The coordinate data is embedded as a Payload Specific Extension in the RTCP report.

In an embodiment, when the change in the coordinate data is greater than a safe threshold value set in the threshold value, the embedding module 113 is further configured for flagging the embedded coordinate data in the RTCP report. The flagging of the coordinate data indicates that the change in the coordinate data is beyond the safe threshold value (may be customized according to the functionality of the device) and helps in ensuring the accuracy and reliability of captured frames captured from the device 100.

This invention is helpful in detecting the displacement of the device 100 after fixing the device 100 in fields. If there is any change in the initial fixed position of the device 100 due to environmental factors or human interface, it may be detected, and the device may provide relative positional changes in X, Y and Z axis from an original or actual position of the device 100 (such calculation to find the positional changes in the X, Y and Z axis is well known in the art and hence is not discussed here). Using the displacement data regarding the positional changes, necessary action may be taken by an external monitoring system or the server. This invention helps in ensuring the accuracy and reliability of captured frames captured through the device 100.

Further, this invention helps in reducing load of computations in the host machine 400 and the device 100 performs it internally.

FIG. 3A represents a flowchart illustrating example method steps of a method 300 executed through the device 100.

At step 301, the method 300 comprises receiving the coordinate data with respect to an original position of the device 100 installed in a predefined area. In some examples, the coordinate data regarding each of a Pitch, Yaw or a Roll position of the device 100.

At step 303, the method 300 comprises monitoring, if there is any change in the coordinate data with respect to the original position of the device 100, in real time.

At step 305, the method 300 comprises embedding the coordinate data in a real-time transport control protocol (RTCP) report in a network communication, based on the monitoring.

At step 307, the method 300 comprises transmitting the coordinate data embedded into the RTCP report over an RTP protocol. This data may be used by any standard client application to receive the RTCP report and check for the displacement of the device 100.

Figure 3B:
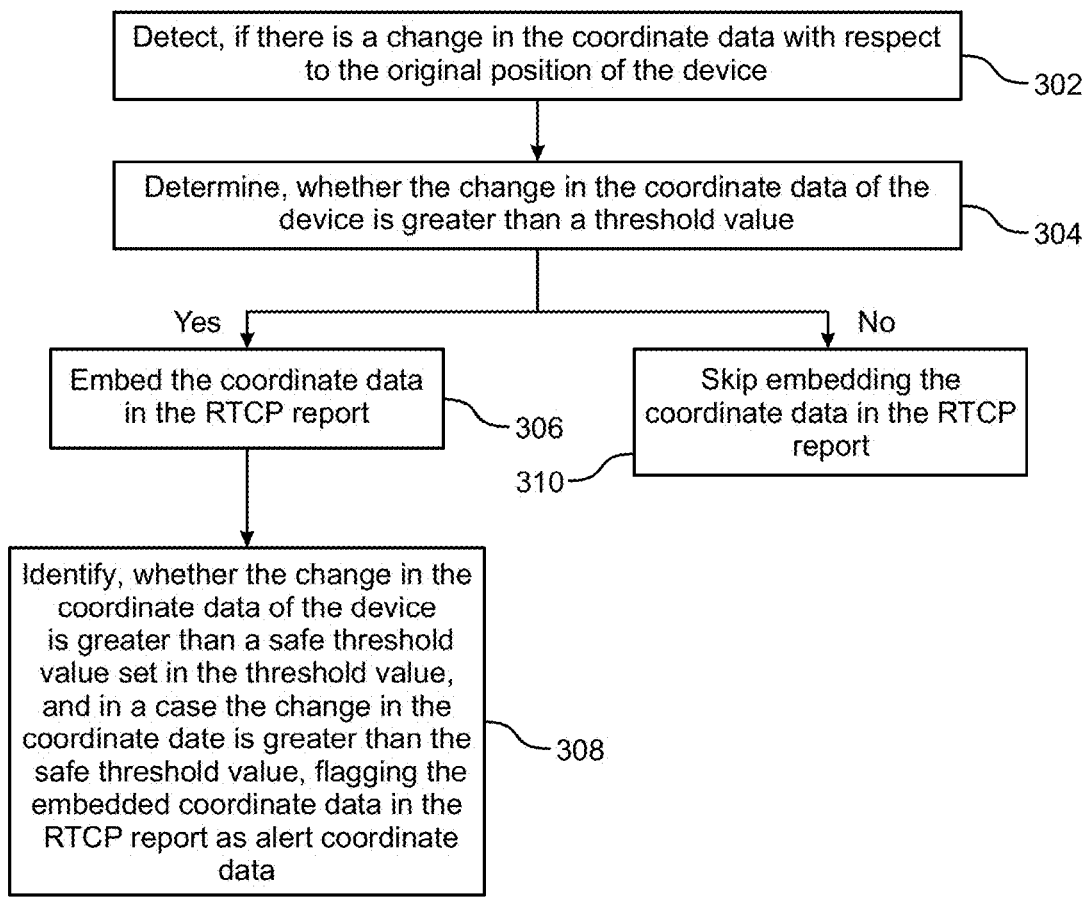
FIG. 3B illustrates a flowchart illustrating further example method steps of the method 300 performed by the device 100, according to some embodiments of the invention.

FIG. 3B represents a flowchart illustrating further example method steps of a method 300 performed by the device 100.

At step 302, the method 300 comprises detecting, if there is a change in the coordinate data with respect to the original position of the device 100.

At step 304, the method comprises determining, whether the coordinate data of the device 100 is greater than a threshold value. If yes, go to step 306 and if no, go to step 310.

At step 306, the method comprises embedding the coordinate data in the RTCP report, in a case the change in the coordinate data is greater than the threshold value.

At step 308, the method further comprises identifying further whether the coordinate data of the device 100 is greater than a safe threshold value set in the threshold value, and in a case the change in the coordinate data is greater than the safe threshold value, flagging the embedded coordinate data in the RTCP report as alert coordinate data.

At step 310, the method comprises not embedding the coordinate data in the RTCP report, in a case the change in the coordinate data is lesser than the threshold value.

The current invention reduces the load of computations in the host machine 400 and the device 100 performs it internally. The current invention makes use of the RTCP sender report and embed the displacement data in protocol level. This data may be used by any standard client application to receive the RTCP report and check for the displacement of the device 100.

Figure 4:
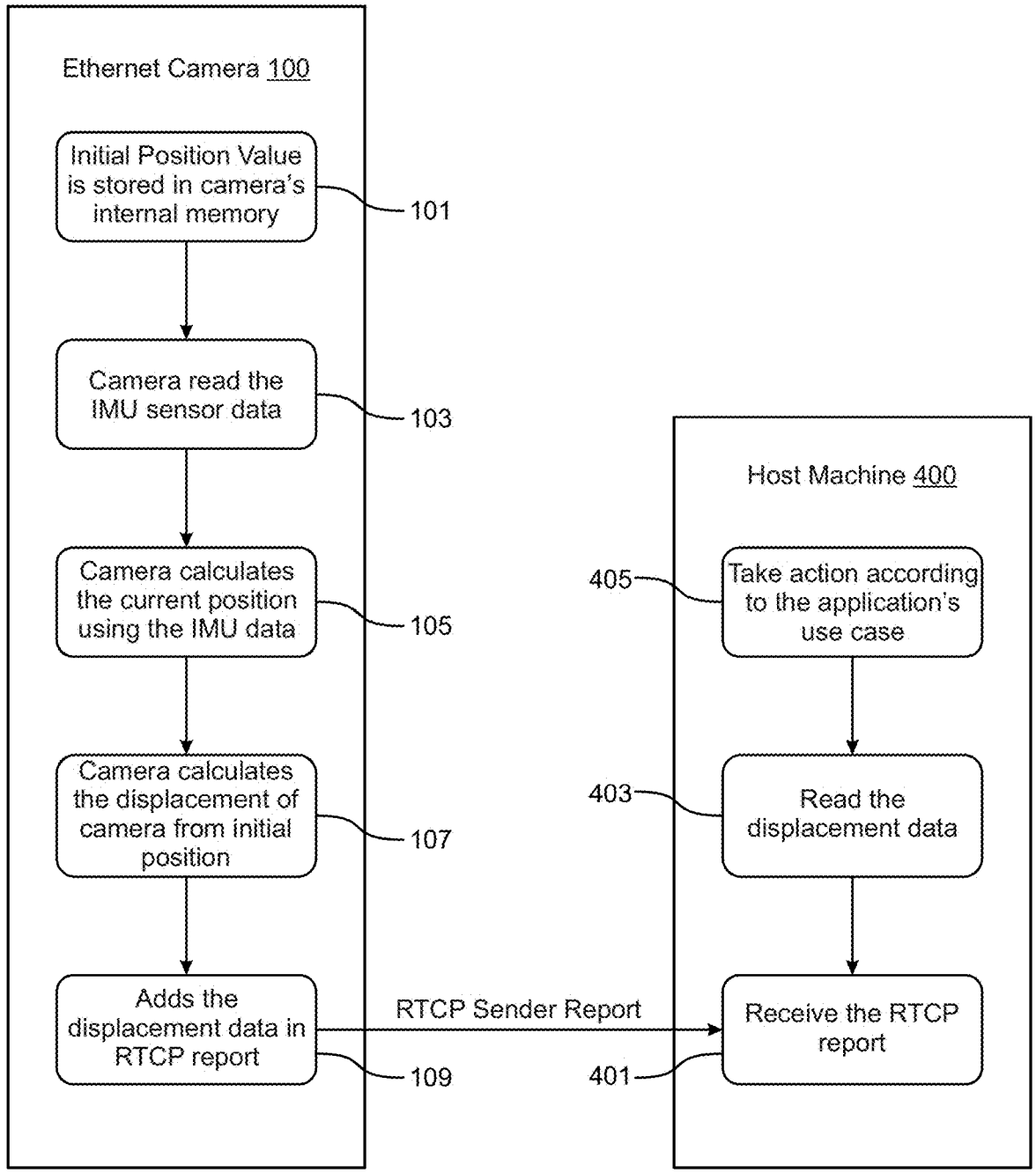
FIG. 4 illustrates an exemplary communication between the device 100 (Ethernet Camera) and a host machine 400, according to some embodiments of the invention.

FIG. 4 represents an exemplary communication between the device 100 (Ethernet Camera) and the host machine 400. In Step 101, the Ethernet camera may be first installed in a preselected place and then Ethernet camera's initial position value may be stored in the internal memory 110. In step 103, the Ethernet camera, through the sensor 106, reads the coordinate data with respect to the current position of the Ethernet camera. The sensor 106 may be, but not limited to, an inertial measurement unit (IMU) sensor or an accelerometer. In steps 105 and 107, the Ethernet Camera further: calculates the current position of the Ethernet camera based on the read coordinate data, and calculates the displacement of the Ethernet camera from its original position. In step 109, the displacement data is added in an RTCP report over a RTP protocol and the added displacement data is transmitted to the host machine 400 or the system 300. In Step 401, the host machine 400 receives the RTCP report from the Ethernet camera. In step 403, the host machine 400 reads the received RTCP report for the displacement data. Further, in step 405, the host machine 400 takes action according to application's use case.

In the present invention, the Ethernet camera provides the relative positional changes in X, Y and Z axis from its original position. Using the displacement data of the Ethernet camera, necessary action may be taken. Therefore, the present invention helps in ensuring the accuracy and reliability of the captured frames.

FIG. 5 represents an example of an RTCP report carrying the displacement data (as shown in block 504) over the RTP protocol level (as shown in block 502). The RTCP report is a type of message that is sent by an active sender in a conference to report transmission and reception statistics for all RTP packets transmitted during a certain time. The RTCP report further contains information such as the absolute timestamp, the sender's packet count, the sender's octet count, and a variable number of receiver report blocks that provide feedback on the quality of service for each stream.

Various examples illustrating zero displacement, normal displacement, and alert displacement calculated by the device are described herein:

Example table 1 indicates installation values associated with the device 100. The installation values includes coordinate data and a threshold value configured for x, y, and z axis data. In an example herein, the coordinate data includes x, y, and z axis data that is received from the sensor 106 (e.g. accelerometer).

TABLE 1

| (Installation values) | |
| --- | --- |
| x Acc Val | 0.8 |
| y Acc Val | 2.8 |
| z Acc Val | 9.8 |
| Threshold Value for x, y and z axis | ±0.3 |

Now, the sensor 106 may sense the x Acc Val as 0.8, y Acc value as 2.8, and z Acc Val as 9.8. Accordingly the identification module 112 compares each of the x Acc Val as 0.8, y Acc value as 2.8, and z Acc Val as 9.8 with the threshold value preset as ±0.3. Further, the embedding module 113 is configured to embed the coordinate data in the RTCP report when at least one of the x Acc Val as 0.8, y Acc value as 2.8, or z Acc Val as 9.8 is greater than the preset threshold value.

Example table 2 indicates zero displacement, which has been identified when there is no change in the coordinate data x, y, and z accelerometer values.

TABLE 2

| (Zero displacement) | |
| --- | --- |
| x Acc Val | 0.8 |
| y Acc Val | 2.8 |
| z Acc Val | 7.8 |

As shown in Table 2 (reproduced above), since there is no change in the coordinate data, the embedding module 113 does not embed the coordinate data in the RTCP report.

Example table 3 indicates normal displacement. The normal displacement has been identified when the x Acc value is greater than or equal to 0.5 and less than or equal to 1.1, the y axis value is greater than or equal to 2.5 and less than or equal to 3.1, and the z axis value is greater than or equal to 7.5 and less than or equal to 8.1.

TABLE 3

| (Normal displacement) | |
| --- | --- |
| x Acc Val | 0.5 <= value <= 1.1 |
| y Acc Val | 2.5 <= value <= 3.1 |
| z Acc Val | 7.5 <= value <= 8.1 |

As shown in the Table 3 (reproduced above), the change in the coordinate data is either equal to or less than the threshold value preset at ±0.3. Therefore, the embedding module 113 does not embed the coordinate data in the RTCP report.

Example table 4 indicates alert displacement. The alert displacement has been identified when the x Acc Value is less than 0.5 or greater than 1.1, the y Acc value is less than 2.5 or greater than 3.1, and the z axis value is less than 7.5 or greater than 8.1.

TABLE 4

(Alert displacement)

| | |
|---|---|
| x Acc Val | value < 0.5 or value > 1.1 |
| y Acc Val | value < 2.5 or value > 3.1 |
| z Acc Val | value < 7.5 or value > 8.1 |

As shown in the Table 4 (reproduced above), the change in the coordinate data of the device is greater than the threshold value preset at ±0.3. Therefore, the embedding module 113 is configured to: embed the coordinate data in the RTCP report, and flagging the coordinate data that indicates the change in the coordinate data is beyond the safe threshold value in the threshold value.

The method of detecting the Ethernet camera displacement after the initial installation is important for ensuring the accuracy and reliability of the captured images and videos. This helps in security surveillance, industrial inspection, and wildlife observations. Further, the RTCP report is used to get the transmission and reception statistics of all RTP packets transmitted during a certain period. This data is constantly used by the client application (the host machine 400) to adjust the transmission rate and encoding. As the device is embedding the camera displacement data in the RTCP report at the protocol level, any standard client application may receive the RTCP report and make use of the displacement data.

Although the present invention has been described in considerable detail with reference to certain preferred embodiments and examples thereof, other embodiments and equivalents are possible. Even though numerous characteristics and advantages of the present invention have been set forth in the foregoing description, together with functional and procedural details, the disclosure is illustrative only, and changes may be made in detail, especially in terms of the procedural steps within the principles of the invention to the full extent indicated by the broad general meaning of the terms. Thus, various modifications are possible of the presently disclosed system and process without deviating from the intended scope of the present invention.

We claim:

1. A method for transmitting coordinate data in a network communication, the method comprising:
   receiving, through a sensor, the coordinate data with respect to an original position of a device and a current position of the device installed in a predefined area;
   determining, through a processor of the device, a displacement data representing a change in the coordinate data with respect to the original position of the device, in real-time, wherein the displacement data includes at least one of a change in pitch, yaw, or roll positions relative to corresponding original pitch, yaw, or roll positions of the sensor;
   determining, through the processor of the device, whether the displacement data exceeds a threshold value by comparing the displacement data with the threshold value;
   embedding, through the processor of the device, the displacement data into a Real-time Transport Control Protocol (RTCP) report along with a timestamp as a Payload Specific Extension in the network communication only when the displacement data exceeds the threshold value;
   flagging, through the processor of the device, the embedded displacement data in the RTCP report when the displacement data exceeds a safe threshold value which is set in the threshold value, wherein the safe threshold value corresponds to a value set greater than the threshold value; and
   transmitting, through a transmitter of the device, the RTCP report including the displacement data over a Real-Time Transport Protocol (RTP),
   wherein the processor is configured to calculate the displacement data internally and embed only the calculated displacement data into the RTCP report, thereby reducing computational load on a host system.

2. The method according to claim 1, further comprising:
   determining, through the processor of the device, whether the displacement data is less than the threshold value; and
   discarding, the displacement data, wherein the displacement data is not embedded in the RTCP report, when the displacement data is less than the threshold value.

3. A device for transmitting coordinate data in a network communication, the device comprising:
   at least one sensor, configured for sensing the coordinate data with respect to an original position and a current position of the device installed in a predefined area;
   a processor configured for:
   receiving, through the at least one sensor, the coordinate data with respect to the original position of the device and the current position of the device installed in the predefined area;
   determining, a displacement data representing a change in the coordinate data with respect to the original position of the device, in real-time, wherein the displacement data includes at least one of a change in pitch, yaw, or roll positions relative to corresponding original pitch, yaw, or roll positions of the at least one sensor;
   determining whether the displacement data exceeds a threshold value by comparing the displacement data with the threshold value; and
   embedding, the displacement data into a Real-time Transport Control Protocol (RTCP) report along with a timestamp, as a Payload Specific Extension in the RTCP report in the network communication only when the displacement data exceeds the threshold value; and
   flagging the embedded displacement data in the RTCP report when the displacement data exceeds a safe threshold value which is set in the threshold value, wherein the safe threshold value corresponds to a value set greater than the threshold value; and
   a transmitter configured for transmitting the RTCP report including the displacement data over a Real-Time Transport Protocol (RTP), wherein the processor is configured to calculate the displacement data internally and embed only the calculated displacement data into the RTCP report, thereby reducing computational load on a host system.

4. The device according to claim 3, wherein the processor is configured for:
   determining, whether the displacement data is less than the threshold value; and
   discarding, the displacement data, wherein the displacement data is not embeded into the RTCP report, when the displacement data is less than the threshold value.

5. The device according to claim 3, wherein the sensor comprises Inertial Measurement Unit (IMU) sensor.

* * * * *